(12) United States Patent
Harada et al.

(10) Patent No.: US 7,095,009 B2
(45) Date of Patent: Aug. 22, 2006

(54) PHOTOPIC DETECTOR SYSTEM AND FILTER THEREFOR

(75) Inventors: Takashi Harada, Machida (JP); Kazuhiko Mizuno, Hachioji (JP); John A. Wheatley, Lake Elmo, MN (US); Timothy J. Nevitt, Red Wing, MN (US); Andrew J. Ouderkirk, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 685 days.

(21) Appl. No.: 10/152,546

(22) Filed: May 21, 2002

(65) Prior Publication Data

US 2003/0218123 A1 Nov. 27, 2003

(51) Int. Cl.
G01J 3/50 (2006.01)
H01J 40/14 (2006.01)
H01J 5/16 (2006.01)

(52) U.S. Cl. ........................ 250/226; 359/359
(58) Field of Classification Search ................ 250/226, 250/208.1, 214 R; 359/359, 588, 589; 356/419
See application file for complete search history.

(56) References Cited

U.S. PATENT DOCUMENTS

| | | | |
|---|---|---|---|
| 3,610,729 A | 10/1971 | Rogers | |
| 3,711,176 A | 1/1973 | Alfrey et al. | |
| 3,792,519 A | 2/1974 | Haver | |
| 3,996,461 A | 12/1976 | Sulzbach et al. | |
| 4,158,133 A | 6/1979 | Spaeth et al. | |
| 4,335,959 A | 6/1982 | Manning | |
| 4,370,025 A | 1/1983 | Sato et al. | |
| 4,446,305 A | 5/1984 | Rogers et al. | |

(Continued)

FOREIGN PATENT DOCUMENTS

| | | |
|---|---|---|
| EP | 0 472 244 | 2/1992 |
| EP | 0 540 215 | 5/1993 |
| GB | 1369332 | 10/1974 |
| JP | 6-118228 | 4/1994 |
| JP | 6-345877 | 12/1994 |
| JP | 2000-98130 | 4/2000 |
| JP | 2000-252482 | 9/2000 |
| WO | WO 95/27919 | 4/1995 |
| WO | WO 95/17303 | 6/1995 |
| WO | WO 95/17691 | 6/1995 |
| WO | WO 95/17692 | 6/1995 |
| WO | WO 95/17699 | 6/1995 |
| WO | WO 95/01440 | 1/1997 |
| WO | WO 99/36248 | 7/1999 |
| WO | WO 99/36258 | 7/1999 |
| WO | WO 99/36262 | 7/1999 |
| WO | WO 99/39224 | 8/1999 |
| WO | WO 02/34514 | 5/2002 |

OTHER PUBLICATIONS

Patent Abstracts of Japan, vol. 017, no. 694 (M–1531) Dec. 17, 1993 & JP 05 237964 A, Sep. 17, 1993.
Patent Abstracts of Japan, vol. 2000, no. 23, Feb. 10, 2001 & JP 2001 166141A, Jun. 22, 2001.

(Continued)

Primary Examiner—Thanh X. Luu
Assistant Examiner—Seung C. Sohn
(74) Attorney, Agent, or Firm—Milena G. Higgins; Stephen C. Jensen (57) ABSTRACT

A detector system, filter therefor, and method of making same is disclosed. The filter includes an interference element having a reflection band disposed primarily in the near infrared, and having a high transmission over most of the visible region. The filter also includes an absorptive element that absorbs light non-uniformly over the visible region. The filter when combined with a semiconductor photodiode or other suitable detector yields a detector system whose spectral responsivity closely matches the visual response of the human eye.

29 Claims, 4 Drawing Sheets

U.S. PATENT DOCUMENTS

| | | |
|---|---|---|
| 4,466,305 A | 8/1984 | Hiraiwa et al. |
| 4,520,189 A | 5/1985 | Rogers et al. |
| 4,521,588 A | 6/1985 | Rogers et al. |
| 4,540,623 A | 9/1985 | Im et al. |
| 4,705,356 A | 11/1987 | Berning et al. |
| 4,799,745 A | 1/1989 | Meyer et al. |
| 5,103,337 A | 4/1992 | Schrenk et al. |
| 5,149,182 A | 9/1992 | Keller |
| 5,179,471 A | 1/1993 | Caskey et al. |
| 5,269,995 A | 12/1993 | Ramanathan et al. |
| 5,316,703 A | 5/1994 | Schrenk |
| 5,360,659 A | 11/1994 | Arends et al. |
| 5,440,446 A | 8/1995 | Shaw et al. |
| 5,448,404 A | 9/1995 | Schrenk et al. |
| 5,486,949 A | 1/1996 | Schrenk et al. |
| 5,600,172 A | 2/1997 | McDevitt et al. |
| 5,644,124 A | 7/1997 | Hamada et al. |
| 5,648,653 A | 7/1997 | Sakamoto et al. |
| 5,686,979 A | 11/1997 | Weber et al. |
| 5,699,188 A | 12/1997 | Gilbert et al. |
| 5,725,909 A | 3/1998 | Shaw et al. |
| 5,783,120 A | 7/1998 | Ouderkirk et al. |
| 5,793,456 A | 8/1998 | Broer et al. |
| 5,808,297 A * | 9/1998 | Jedlicka et al. ............. 250/226 |
| 5,808,794 A | 9/1998 | Weber et al. |
| 5,811,923 A | 9/1998 | Zieba et al. |
| 5,825,542 A | 10/1998 | Cobb, Jr. et al. |
| 5,882,774 A | 3/1999 | Jonza et al. |
| 5,962,114 A | 10/1999 | Jonza et al. |
| 5,965,247 A | 10/1999 | Jonza et al. |
| 5,973,865 A | 10/1999 | Havens et al. |
| 6,010,751 A | 1/2000 | Shaw et al. |
| 6,045,864 A | 4/2000 | Lyons et al. |
| 6,045,894 A | 4/2000 | Jonza et al. |
| 6,049,419 A | 4/2000 | Wheatley et al. |
| 6,067,188 A | 5/2000 | Zieba et al. |
| 6,096,247 A | 8/2000 | Ulsh et al. |
| 6,107,564 A | 8/2000 | Aguilera et al. |
| 6,157,490 A | 12/2000 | Wheatley et al. |
| 6,181,395 B1 | 1/2001 | Li et al. |
| 6,368,699 B1 | 4/2002 | Gilbert et al. |
| 6,451,414 B1 | 9/2002 | Wheatley et al. |
| 6,459,514 B1 | 10/2002 | Gilbert et al. |
| 2002/0015836 A1 | 2/2002 | Jonza et al. |
| 2002/0024625 A1 | 2/2002 | Anderson et al. |
| 2002/0025444 A1 | 2/2002 | Hebrink et al. |
| 2003/0218123 A1 | 11/2003 | Harada |

OTHER PUBLICATIONS

Patent Abstracts of Japan, vol. 1999, no. 13, Nov. 30, 1999 & JP 11 231129, Aug. 27, 1999.

"Photopic Filter", © 1995–2000 Software Spectra, Inc., [Updated on the internet on Feb. 11, 2000], [retrieved from the internet Feb. 20, 2002], <http://www.sspectra.com/designs/photopic.html>, pp2.

TN1421—Chapter 4a: Filter Detector Systems and Use, Photometry and Colorimetry, [retrieved from the internet on Feb. 18, 2002], <http://physics.nist.gov/Pubs/TN1421/filter.html>, pp 6.

PMA2130 Photopic Detector, Solar Light Co. Inc., Philadelphia, PA, USA, [retrieved from the internet Feb. 20, 2002], <http://www.solar.com/pma2130.htm>, pp3.

"OL 730–5A and OL 730–5C UV–Enhanced Silicon Detector" Optronic Laboratories, Inc., Bulletin 133, Rev. May /2000, pp 2.

"Lumesphere Plus, Total Luminous Flux System" Optronic Laboratories, Inc., Bulletin 141, Rev. Mar. /1999, pp 2.

"Model 24600–Series Silicon Detector Head", Gamma Scientific, San Diego, CA, [retrieved from the internet on Feb. 18, 2002], <http://www.gamma–sci.com/24600_DetectorHead.htm>, pp2.

Japanese Industrial Standard JIS–C–1609, "Illuminance meters", Japanese Standards Association, Japan, 1993.

*The Basis of Physical Photometry*, Commission International de l'Eclairage (CIE), Pub. No. 18.2, 1983.

Schrenk et al., Nanolayer polymeric opitcal films, Tappi Journal, pp. 169–174, Jun., 1992.

Weber et al., "Giant Birefringent Optics in Multilayer Polymer Mirrors", Science, vol. 287, Mar. 31, 2000, pp 2451–2456.

Tait, Multilayer Optical Film with Melt Zone to Control Delamination, U.S. Appl. No. 10/152411, filed May 21, 2002.

Tait et al., Method for Subdividing Multilayer Optical Film Cleanly and Rapidly, U.S. Appl. No. 10/152412, filed May 21, 2002.

Weber et al., Color Shifting Film, U.S. Appl. No. 09/006591, filed Jan. 13, 1998.

Ouderkirk et al., Infrared Interference Filter, U.S. Appl. No. 09/890482, filed Jul. 26, 2001.

Lin et al., Wrinkle Resistant Infrared Reflectintg Film and Non–Planar Laminate Articles Made Therefrom, U.S. Appl. No. 09/590924, filed Jun. 9, 2000.

Tait, Multilayer Opitcal Film with Melt Zone to Control Delamination, USSN 10/268354, filed Oct. 10, 2002.

Tait et al., Method for Subdividing Multilayer Optical Film Cleanly and Rapidly, U.S. Appl. No. 10/268118, filed Oct. 10, 2002.

* cited by examiner

PHOTOPIC DETECTOR SYSTEM AND FILTER THEREFOR

FIELD OF THE INVENTION

The present invention relates to detector systems having filters that produce a desired spectral response. More particularly, the present invention relates to detector systems that have a spectral responsivity substantially matched to that of the human eye, and filters therefor.

BACKGROUND

Electronic detectors have long been used in photography and related fields to provide a measurement of the brightness of a scene or object. In order for the measurement to at least crudely represent the brightness as perceived by the human eye, detectors such as the cadmium sulfide photocell have been used. These detectors have spectral responsivities that peak in the visible region and at least roughly approximate the responsivity of the human eye. Such detectors, however, have characteristics that make them less than ideal for many uses.

More recently, optical filters have been used in combination with other detectors to provide a closer match to the human eye response.

In one approach, set forth in U.S. Pat. No. 3,996,461 (Sulzbach et al.), a multilayer thin film optical filter is deposited directly on the detecting surface of a silicon photodiode. The individual dielectric layers of the multilayer filter are deposited one at a time (on at least 50 silicon slices, each slice containing approximately 300 detectors) until an interference stack is built up. The multilayer filter is designed to reduce the light reaching the photodiode as a function of wavelength so that the detector system (photodiode with multilayer filter) has a spectral response close to that of the human eye. Because the silicon photodiode by itself has a spectral response weighted towards the red in the visible region but that continues to increase well into the infrared region, the multilayer filter reduces light transmission in both the infrared region and the visible region to yield the desired system response.

In another approach, phosphate glass-based filters containing copper ions are used as filters for the detectors. One drawback to these systems is the vulnerability of the phosphate glass to moisture. Another is the inconvenience and/or difficulty in processing the glass in molding, cutting, and polishing operations, as well as the relatively large specific gravity of the glass. Glass filters also tend to be quite thick and heavy, which is not desirable for many applications.

In other approaches, synthetic resin-based filters are used in place of glass-based filters. For example, Japanese patent publications JP 06-118,228 and JP 06-345,877 disclose an optical filter made of synthetic resin consisting of a copolymer copolymerized from a mixture of a monomer containing phosphoric acid group of a specific structure and a monomer capable of being copolymerized with it. The filter also includes a metal salt mainly composed of copper salt. The phosphorous containing monomer has a phosphoric acid ester bond. The phosphoric acid group causes the polymer to have poor weather resistance. As a result, if such an optical filter is exposed to high temperature and high humidity, problems relating to whitening (turbidity) and loss of transparency (opacification) begin to develop.

Other resin-based filters have also been proposed. Japanese patent publications 2000-98130 and 2000-252482 disclose an optical filter with improved durability by use of a polymer with a specially designed chemical structure. Such filters unfortunately have poor absorption of light in the near infrared region and the ultraviolet region. Detector systems using such filters therefore are sensitive to light that is not perceived by the human eye.

There is a continuing need for alternative detector systems that can simulate the human eye response, particularly systems having good out-of-band rejection (i.e., negligible response in near infrared and ultraviolet wavelengths), a good match to the desired response in the visible, and good weather resistance.

BRIEF SUMMARY

The present application discloses detector systems in which a filter positioned in front of a detector selectively transmits light in such a way that the combined filter/detector system closely matches a human eye response. The filter comprises an interference element and an absorptive element. The absorptive element is preferably a polymeric film with one or more specially tailored pigments or other colorants dispersed therein. The interference element is also preferably polymeric, in some embodiments being a coextruded polymer multilayer film. The interference element at normal incidence provides high average transmission (at least about 50%, and more preferably at least about 70%) in the visible region, and low transmission (less than about 5%, more preferably less than about 2% or 1%) throughout a reflection band that extends into the near infrared region. The reflection band of the interference element extends far enough into the near infrared to ensure negligible sensitivity of the detector system to near infrared light. The absorptive element has one or more selected colorants that provide a non-uniform transmission in the visible, preferably having a bell-shaped characteristic suitable to provide the detector system with a near-human eye response in the visible portion of the spectrum when combined with the interference element.

The filter can be tailored for use with semiconductor photodiodes such as silicon photodiodes. A variety of filter configurations are disclosed, including an absorptive film that is applied to a polymeric interference film, or applied to the detector surface. The absorptive element can also be adhered to the interference element by a suitable adhesive layer, or incorporated into one or more individual layers of the interference element. In some embodiments, the filter can extend across a first aperture of a filter assembly, and the filter assembly can include a second aperture adapted to receive a detector assembly. This modular design has certain advantages relative to a system in which the filter elements are all applied directly to the detector surface. The system can include additional optical elements such as a light scattering layer to reduce angular dependency.

BRIEF DESCRIPTION OF THE DRAWINGS

Throughout the specification reference is made to the appended drawings, where like reference numerals designate like elements, and wherein.

DETAILED DESCRIPTION OF THE ILLUSTRATIVE EMBODIMENTS

Portions of the following description are concerned with how close the response of a detector system can be made to a desired spectral response. For purposes of this application, the following figure of merit "FM" (expressed as a percentage) is used to quantify how close the normalized spectral responsivity of a detector system, D(λ), is to a desired or target spectral responsivity, T(λ):

$$FM = \frac{\sum_{\lambda=380}^{780} |D(\lambda) - T(\lambda)| \Delta\lambda}{\sum_{\lambda=380}^{780} T(\lambda)\Delta\lambda} \times 100, \qquad \text{(Eq. 1)}$$

where the summation is done over 81 intervals for which the wavelength increment Δλ=5 nm. This is in conformity with Japanese Industrial Standard JIS-C-1609 (1993). For purposes of this application the detector system responsivity D(λ) is considered close to the target function T(λ) if the figure of merit FM is less than about 25%, more preferably less than about 20%. Unless otherwise noted, the figure of merit is evaluated for light normally incident upon the detector system.

In one important case of interest, the target responsivity T(λ) is the standard photopic response of the human eye V(λ). The photopic response V(λ), also known as the spectral luminous efficiency function, is a bell-shaped function defined in the range from 360–830 nm and has a maximum value of 1.0 at 555 nm. In other cases the target responsivity can be the response of the human eye at low luminance levels, referred to as the scotopic response V'(λ). The V'(λ) function is a bell-shaped function having a maximum of 1.0 at 507 nm. Both functions V(λ) and V'(λ) can be found in a publication of the Commission International de l'Eclairage (CIE) entitled *The Basis of Physical Photometry*, CIE Publication No. 18.2 (1983), incorporated herein by reference.

For purposes of this application, unless otherwise noted, the term "ultraviolet" refers to electromagnetic radiation whose wavelength is less than about 400 nm, the term "visible" refers to a wavelength range from about 400 to about 700 nm, and the term "near infrared" refers to a wavelength range from about 700 to about 2500 nm. The term "detector" refers to a structure that converts electromagnetic energy into an electrical signal, whether in final packaged form or in earlier stages of construction, including in the case of a semiconductor detector a semiconductor wafer having formed therein one or more active junction areas. Examples of suitable detectors include, but are not limited to, photodiodes and photodiode arrays, and solid-state camera elements such as CCD image sensors and MOS image sensors.

Figures 1, 2:
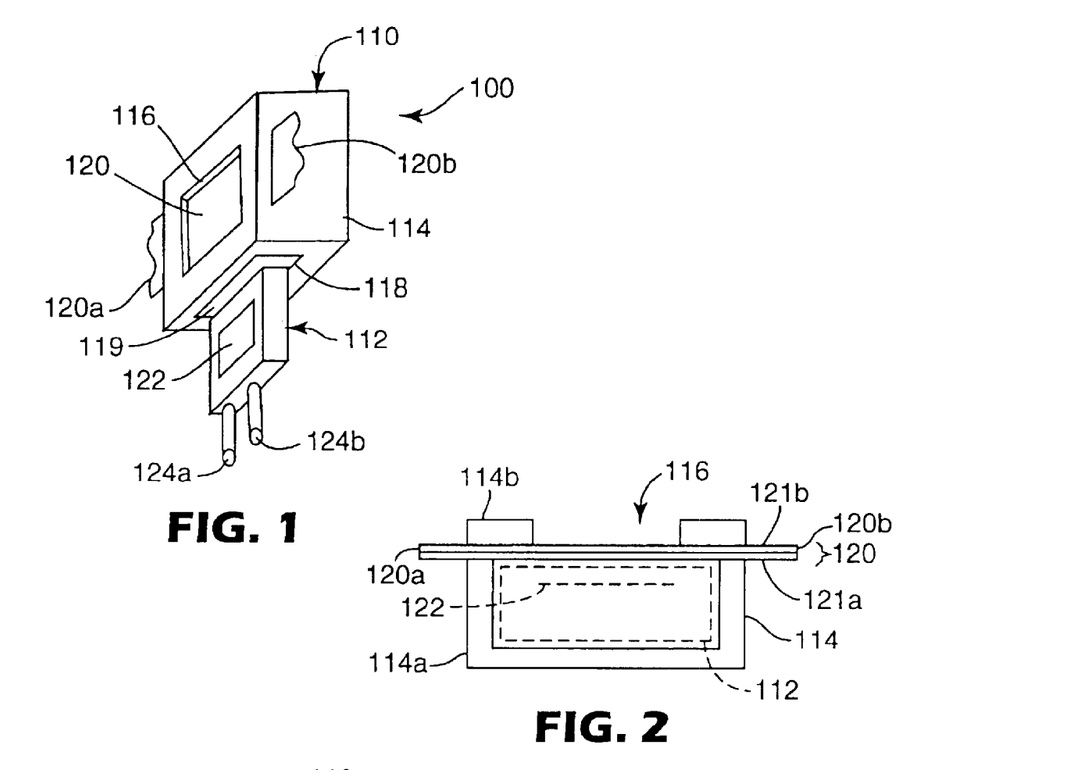
FIG. 1 is a perspective view of a detector system.
FIG. 2 is a cross-sectional view of a filter assembly for a detector system, where the detector assembly is shown fully engaged and in phantom.

FIG. 1 depicts an embodiment of a detector system 100. The detector system includes a filter assembly 110 and a detector assembly 112. Filter assembly 110 comprises a filter housing 114 having at least two apertures 116, 118. Aperture 116 is adapted to receive a filter element 120. In one construction, housing 114 is made of an opaque thermoplastic material that is injection molded around a pre-existing strip of filter material. FIG. 2 shows the filter assembly 110 in sectional view, where a lower portion of filter housing 114 is labeled 114a and an upper portion of filter housing 114 is labeled 114b. Filter element 120 is sandwiched between portions 114a, 114b. Preferably, two, three, four, or more filter housings 114 are formed simultaneously in a line along the strip of filter material. After the injection molded material cools, the strip can be cut at locations between adjacent housings 114, as at ends 120a, 120b, to yield individual filter assemblies 110. Alternatively, an individual pre-cut piece of filter material can be applied to a previously manufactured filter housing 114.

Aperture 116 can be a physical opening in the filter housing 114 as shown in the figure, or it can be an optical aperture that transmits light detectable by the detector assembly 112 to the active area of the detector. The optical aperture can be a window in an opaque filter housing, or the filter housing can be constructed entirely of a material that transmits light to the active area of the detector.

Aperture 118 is adapted to receive detector assembly 112. In the embodiment shown, aperture 118 is bounded by portions of both filter housing portions 114a, 114b. Aperture 118 is sized and shaped to receive detector assembly 112, shown disengaged in FIG. 1. When the detector assembly is fully inserted into the cavity defined by aperture 118 (see FIG. 2), an active area 122 of the detector is substantially aligned with aperture 116 and positioned behind filter element 120. Hence, light propagating toward aperture 116 along an axis perpendicular thereto passes through filter element 120 before striking the detector active area 122. The detector assembly 112 can optionally include a conventional window or lens element that covers the active area 122. A light-transmissive potting material 119 such as an epoxy can optionally be provided in the cavity defined by aperture 118 prior to insertion of the detector assembly, so that when the detector assembly 112 is fully inserted the potting material completely surrounds detector assembly 112 and holds it in place within filter assembly 110. Wires or leads 124a, 124b provide an electrical signal in response to light impinging on the active area 122. In the case of semiconductor photodiodes, the signal is an electrical current. For other types of detectors the signal can take on other formats such as a resistance change or an electric potential. Preamplifier circuitry can optionally be provided within the detector assembly 112.

As shown in FIG. 2, the filter element 120 is preferably a relatively thin polymer-based film, composed of two main components: (1) a reflective interference element 121a and (2) an absorptive element 121b. The elements are preferably in the form of films or film laminates for design flexibility and for compatibility with low weight and small size, which can be important considerations in some detector system applications. In this regard, "film" refers to an extended optical body whose thickness is generally no more than about 0.25 mm (10 thousandths of an inch, or "mils"). In some instances a film can be attached or applied to another optical body such as a rigid substrate or another film having suitable reflection or transmission properties. The film can also be in a physically flexible form, whether it is free-standing or attached to other flexible layer(s). The term "film body" as used herein shall mean a film whether by itself or in combination with other components.

Elements 121a, 121b both completely fill the aperture 116 and cover or otherwise extend over the detector active area 122. The use of no aperture, or an aperture that is smaller than the detector active area is also possible. In some embodiments the elements 121a, 121b can be co-extensive with each other. In other embodiments the absorptive element 121b can be coated directly on the active area of the detector 122 or mixed into a light transmissive potting material holding the detector in position, while the interference element 121a covers the aperture 116. Whether or not an aperture is used, the components are arranged such that substantially all light that strikes the detector active area passed through both the interference element and the absorptive element.

Interference element 121a is preferably a multilayer polymeric film (or film body) made by co-extrusion of typically tens or hundreds of layers of alternating polymers, followed by optionally passing the multilayer extrudate through one or more multiplication die, and then stretching or otherwise orienting the extrudate to form the final film. The resulting film is composed of typically tens or hundreds of individual microlayers whose thicknesses and refractive indices are tailored to provide a reflection band disposed primarily in the near infrared region of the spectrum. Preferably, adjacent microlayers exhibit a difference in refractive index ($\Delta n_x$) for light polarized along an x-axis of at least 0.05, and likewise exhibit a difference in refractive index ($\Delta n_y$) for light polarized along a y-axis of at least 0.05, where the x- and y-axes are mutually orthogonal and define the plane of the film 121a. The adjacent microlayers also preferably exhibit a refractive index difference ($\Delta n_z$) for light polarized along a z-axis perpendicular to the x- and y-axes that is tailored to achieve desirable reflectivity properties for the p-polarization component of obliquely incident light.

For ease of explanation in what follows, at any point of interest on an interference film the x-axis will be considered to be oriented within the plane of the film such that the magnitude of $\Delta n_x$ is a maximum. Hence, the magnitude of $\Delta n_y$ can be equal to or less than (but not greater than) the magnitude of $\Delta n_x$. Furthermore, the selection of which material layer to begin with in calculating the differences $\Delta n_x$, $\Delta n_y$, $\Delta n_z$ is dictated by requiring that $\Delta n_x$ be non-negative. In other words, the refractive index differences between two layers forming an interface are $\Delta n_j = n_{1j} - n_{2j}$, where j=x, y, or z and where the layer designations 1,2 are chosen so that $n_{1x} \geq n_{2x}$, i.e., $\Delta n_x \geq 0$.

To maintain high reflectivity of p-polarized light at oblique angles, the z-index mismatch $\Delta n_z$ between microlayers can be controlled to be substantially less than the maximum in-plane refractive index difference $\Delta n_x$, such that $\Delta n_z \leq 0.5 * \Delta n_x$. More preferably, $\Delta n_z \leq 0.25 * \Delta n_x$. A zero or near zero magnitude z-index mismatch yields interfaces between microlayers whose reflectivity for p-polarized light is constant or near constant as a function of incidence angle. Furthermore, the z-index mismatch $\Delta n_z$ can be controlled to have the opposite polarity compared to the in-plane index difference $\Delta n_x$, i.e. $\Delta n_z < 0$. This condition yields interfaces whose reflectivity for p-polarized light increases with increasing angles of incidence, as is the case for s-polarized light. Further details of suitable polymeric interference films and related constructions can be found in U.S. Pat. No. 5,882,774 (Jonza et al.), and PCT Publications WO 95/17303 (Ouderkirk et al.) and WO 99/39224 (Ouderkirk et al.), all of which are incorporated herein by reference. In a simple embodiment, the microlayers can have thicknesses corresponding to a ¼-wave stack, i.e., arranged in optical repeat units or unit cells each consisting essentially of two adjacent microlayers of equal optical thickness (f-ratio= 50%), such optical repeat unit being effective to reflect by constructive interference light whose wavelength λ is twice the overall optical thickness of the optical repeat unit. A thickness gradient along a thickness axis of the film (e.g., the z-axis) is used to widen the reflection band to extend between the desired short and long wavelength band edges, discussed below. Thickness gradients tailored to sharpen such band edges can also be used, as discussed in U.S. Pat. No. 6,157,490 (Wheatley et al.), also incorporated herein by reference.

Other layer arrangements, such as multilayer films having 2-microlayer optical repeat units whose f-ratio is different from 50%, or films whose optical repeat units consist essentially of more than two microlayers, are also contemplated. These alternative optical repeat unit designs can reduce or eliminate certain higher-order reflections, i.e., reflections at wavelengths that are a fraction of the design wavelength λ. For example, second, third, and fourth order reflections (λ/2, λ/3, and λ/4 respectively) can be eliminated using optical repeat units consisting essentially of six microlayers arranged in alternating high and low refractive index in relative optical thicknesses of 7:1:1:7:1:1, as taught in U.S. Pat. No. 5,360,659 (Arends et al.). Second, third, and fourth order reflections can also be eliminated using optical repeat units consisting essentially of three distinct optical materials H, M, L of high, medium, and low refractive index respectively, arranged in the order HMLM with relative optical thicknesses of 2:1:2:1 as taught in U.S. Pat. No. 5,103,337 (Schrenk et al.).

The simple ¼-wave stack referred to previously produces significant third-order reflections. Thus, an interference element comprising a ¼-wave stack that has a first-order reflection at λ=1200 nm or greater will have significant reflections at about λ/3=400 nm or greater.

For some applications, it may be desirable to combine two or more multilayer films either to increase the overall reflectivity or to increase the bandwidth over which light is reflected. Such combinations can be made, for example, by laminating the two or more multilayer optical films together with a suitable optically clear adhesive.

Interference element 121a can alternatively comprise more conventional vacuum-deposited inorganic multilayer films whose microlayers (e.g., $TiO_2$ for high refractive index microlayers and $SiO_2$ for low refractive index microlayers) are isotropic in refractive index. Because greater layer-to-layer in-plane refractive index differences $\Delta n_x$ and $\Delta n_y$, can typically be achieved than with coextruded polymers, fewer microlayers are required to yield a given reflectivity value for normally incident light (incidence angle=0). However, such inorganic multilayer films are generally not preferred because of the relatively cumbersome vacuum deposition process required (in which each layer must be laid down separately), the need for rigid high-temperature substrates (usually thick glass), and the decrease in reflectivity (and accompanying increase in transmission) of p-polarized light with increasing incidence angle.

Interference element 121a can alternatively comprise a cholesteric (chiral nematic) liquid crystal film. These films consist of a layer of polymeric material having a cholesteric order, where the axis of the molecular helix of the cholesteric material extends transversely to the layer. The films can be manufactured so that the pitch of the helix changes along the thickness of the film to provide the film with a broad reflection band over a desired wavelength range. Right- and left-handed cholesteric layers can be combined to reflect two orthogonal polarization states of incident light—left and right circular polarization states. Reference is made to U.S. Pat. Nos. 5,793,456 (Broer et al.) and 6,181,395 (Li et al.), both incorporated herein by reference. Alternately, interference element 121a can comprise a polymeric backing with a metal/inorganic oxide stack such as is described in U.S. Pat. No. 4,799,745 (Meyer et al.) or an alternating polymer/inorganic oxide stack prepared by the methods described in U.S. Pat. Nos. 5,440,446 (Shaw et al.), 5,725,909 (Shaw et al.), 6,010,751 (Shaw et al.), and 6,045,864 (Lyons et al.).

Regardless of which technology is chosen, interference element 121a is manufactured to substantially reflect normally incident light in a spectral band lying primarily in the near-infrared region and to substantially transmit normally incident light over most or substantially all of the visible wavelength region. The interference element preferably provides an average transmission of at least about 50%, and more preferably at least about 70% in the visible region, and provides a transmission of less than about 5%, more preferably less than about 2% or 1% throughout a reflection band that extends into the near infrared region. For detector systems utilizing silicon photodiodes, the 5%, 2%, and 1% transmission limits preferably cover a range from about 800 nm to about 1100 nm, or from about 700 nm to about 1200 nm. In many cases the interference element has negligible absorption so that the percent transmission plus the percent reflection at a given wavelength is about 100%.

Another main component of filter element 120 is absorptive element 121b. This is also preferably a polymer-based film or film body for ease of manufacture and design flexibility. Absorptive element 121b contains one or more colorants, which can include pigments or dyes that absorb non-uniformly over visible wavelengths. Moreover, it has been found that suitable colorants can provide the detector system with an effective responsivity that closely matches a sensitivity of the human eye (e.g., standard photopic visual response $V(\lambda)$) at least over the visible wavelength range. For example, if the spectral responsivity of the detector assembly 112 is a function $DET(\lambda)$ and the spectral transmission of absorptive element 121b at normal incidence is a function $AF(\lambda)$, then a function defined as $DET(\lambda)$ multiplied by $AF(\lambda)$ multiplied by a suitably chosen normalization constant will give a figure of merit FM (see Eq. 1) of about 20% or less, more preferably about 10% or less, relative to the photopic function $V(\lambda)$. The normalization constant is chosen so that the maximum value of the function $DET(\lambda) * AF(\lambda)$ is equal to 1.

Absorptive element 121b preferably comprises a green pigment dispersed therein. The pigment is dispersed in a matrix that forms a film, the matrix material being substantially transparent over visible wavelengths for typical film thicknesses contemplated. The green pigment provides a first approximation to a standard human eye spectral response, since green is dominant in human vision. Note, however, that to the extent the spectral responsivitity of the detector system changes across the visible region, the ideal transmission characteristic of the absorptive element 121b will be skewed to compensate so as to produce a detector system that matches the human response. Examples of useful green pigments include veridian green pigment (a chromium (m) oxide powder available from a number of companies such as Toyo Ganryou Kogyou, Japan) (referred to herein as "PG-18"), malachite lake green (a copper-based material, available from Sansui Shikso Ltd., Japan) (referred to herein as "PG-4"), phthalocyanine green (an organic material available from BASF Ltd.) (referred to herein as "PG-7"), and phthalocyanine green 6Y (an organic material available from Clariant International Ltd., Switzerland) (referred to herein as "PG-36"). Among these, phthalocyanine green and phthalocyanine green 6Y are preferred because they can support a high peak light transmission and can also achieve a close match to the human eye response. One type of phthalocyanine green 6Y pigment is sold under the trade name Hostaperm Green 8G by Clariant International Ltd. The green pigment can be kneaded into the matrix material or a resin precursor and molded, extruded, or otherwise formed into a film or other layer. The concentration of the green pigment in the matrix and the thickness of the film should be controlled to achieve the desired spectral absorption characteristic. The green pigment can alternatively be dispersed in a solvent containing a binder component, and coated onto a pre-formed substrate to form absorptive element 121b, or the absorptive element 121b can be coated directly on the interference element 121a, on the surface of the detector in the active area 122, or onto a window or lens element that covers the active area 122. For some applications, the green pigment can be dispersed in a light transmissive potting material such as an epoxy that surrounds detector assembly 112, or if a transparent thermoplastic material is used to form the filter housing 114, the green pigment can be dispersed in the filter housing material prior to injection molding.

A single green pigment is limited in how close it can make the detector system match the target response. Applicants have found that a yellow pigment is also preferably included in the optical path of the detector system to refine the detector system to even more closely match the target response. Preferably, the yellow pigment is mixed with the green pigment in absorptive element 121b. Both organic and inorganic pigments can be used, but organic pigments are preferred due to their high peak light transmission and ability to achieve a close match to the target response. The yellow pigment can comprise a mixture of at least two types of yellow, a relatively long wavelength ("redish") yellow and a relatively short wavelength ("bluish") yellow, described in more detail below.

Examples of suitable organic yellow pigments include acetoacetic acid anilide monoazo pigments such as Hansa Yellow G (C. I. No. Pigment Yellow-1, and abbreviated herein as PY-1), Hansa Yellow 10G (C. I. No. PY-3), Hansa Yellow RN (C. I. No. PY-65), Hansa Brilliant Yellow 5GX (C. I. No. PY-74), Hansa Brilliant Yellow 10GX (C. I. No. PY-98), Permanent Yellow FGL (PY-97), Simura Lake Fast Yellow 6G (PY-133), Lionol Yellow K-2R (PY-169), acetoacetic acid anilide disazo pigment such as Disazo Yellow G (PY-12), Disazo Yellow GR (PY-13), Disazo Yellow 5G (PY-14), Disazo Yellow 8G (PY-17), Disazo Yellow R (PY-55), Permanent Yellow HR (PY-83), azo condensation pigments such as Chromophthal Yellow 3G (PY-93), Chromophthal Yellow 6G (PY-94), benzimidazolone monoazo pigments such as Hostaperm Yellow H3G (PY-154), Hostaperm Yellow H4G (PY-151), Hostaperm Yellow H2G (PY-120), Hostaperm Yellow H6G (PY-175), Hostaperm Yellow HLR (PY-156), isoindolinone pigments such as Irgazin Yellow 3RLTN (PY-110), Irgazin Yellow 2RLT, Irgazin Yellow 2GLT (PY-109), Fastogen Super Yellow GROH (PY-137), Fastogen Super Yellow GRO (PY-110), Sandrin Yellow 6GL (PY-173), and other pigments, for example, Indanthrone pigments such as Flavantrone (PY-24), Anthramyrimidine (PY-106), Phthaloyl Amide type Anthraquinone (PY-123), Heliofast Yellow E3R (PY-99), metal complex pigments such as azo nickel complex pigment (PY-150), nitroso nickel complex pigment (PY-153), azomethine copper complex pigment (PY-117), quinophthalone pigments such as Phthalimide Quinophthalone (PY-138), Paliotol Yellow D1819 (PY-139), isoindoline pigments, for example, Paliotol Yellow D1155 (PY-185), and benzimidazolone pigments, for example, Toner Yellow HGTRAN (PY-180). Among these pigments, PY-150, PY-138, PY-139, PY-185, PY-180, and PY-110 are preferred, since it is possible with these pigments to achieve closer coincidence with the spectral luminous efficiency, and in addition, these pigments have high weather resistance. For added flexibility, a plurality of different colorants can be combined to form the absorptive element, whether by mixing the colorants together in a single layer or providing them in separate layers anywhere in the optical path, to more closely match the target function. For example, at least two different yellow pigments can be combined. Yellow pigments generally have a high absorption (percent transmission less than about 10%) for blue light between about 400–450 nm, and low absorption (percent transmission greater than about 90%) for wavelengths between about 550–700 nm. A cut-on transition separates these two regions, and the cut-on transition can differ in wavelength from one yellow pigment to another. Yellow pigment PY-139, for example, is a redish yellow and has a cut-on transition (measured at 50% transition point) at about 520 nm, while PY-180 has a cut-on transition at about 490 nm.

Matrix materials suitable for forming element 121b include, for example, polyester such as polyethylene terephtalate, and plastics having good thermal stability such as polypropylene, cellophane, polycarbonate, cellulose acetate, triacetyl cellulose, polyethylene, polyvinyl chloride, polyvinyl alcohol, fluorine-containing resins, chlorinated rubber, and ionomer. The thickness of the substrate is dependent upon the material so as to obtain suitable strength and light transmittance, but is typically in the range of, for example, 10 to 200 μm.

To form the element 121b, a resin composition capable of crosslinking can be used, including, more specifically, an electron beam-curable product or UV-curable product of monomers and oligomers having unsaturated bond, and reaction-curable product of thermoplastic resin having reactive group in the resin with polyisocyanate or glycidyl compound. As the above thermoplastic resin containing reactive group in the resin, resins known in the art can be used, including, for example, polyester resins, polyacrylic acid ester resins, polyacrylic acid, styrene resins, polyvinyl acetate resins, polyurethane resins, styrene acrylate resins, polyacrylate resins, polyacryl amide resins, polyamide resins, polyether resins, polystyrene resins, polyethylene resins, polypropylene resins, polyolefin resins, vinyl resins such as polyvinylchloride resins and polyvinyl alcohol resins, cellulose resins such as cellulose resin, hydroxyethyl cellulose resins and cellulose acetate resins, polyvinyl acetal resins such as polyvinyl acetoacetal resins and polyvinyl butyral resins, silicone-modified resins and long chain alkyl-modified resins. Particularly preferred are polyacrylic acid ester resin and polyacrylic acid styrene resin.

Setting (i.e., curing) methods for such binder resins are not particularly limited, and can include heating and irradiation with ionizing radiation. Various isocyanate setting agents have been conventionally known, and among them, use of adduct form of aromatic isocyanates is preferred, including, among commercially marketed products, TAKENATE (manufactured by Takeda Chemical Industries, Ltd.), BURNOCK (manufactured by Dainippon Ink and Chemicals, Inc.), Koronate (manufactured by Nippon Polyurethane Industry Co.), and Dismodule (manufactured by Bayer Co.). As with isocyanate setting agents, various epoxy setting agents have been conventionally known, including, as commercially available products, bisphenol A type epoxy resins such as EPIKOTE 828 (manufactured by YUKA Shell Epoxy, Co.), and novolac epoxy resins such as EPIKOTE 180S80 (manufactured by YUKA Shell Epoxy, Co.), and sorbitol epoxy resins such as Denacol EX-614 (manufactured by Nagase Chem Tex, Co.). The amount of added polyisocyanate and epoxy resin in relation to 100 parts by weight of the above binder resin used, is preferably in the range of 5 to 100 parts by weight, more preferably in the range of 20 to 80 parts by weight. When the amount of the additives is too small, density of the crosslinking becomes low, leading to insufficient heat resistance and chemical resistance. When the amount of the additives is too large, the pot life of the coating liquid becomes short and the coated surface becomes too sticky, leading to inconveniences such as difficult handling during the manufacturing process.

As the resin composition capable of crosslinking, an electron beam-set product or UV-set product of monomers and oligomers having unsaturated bonds can be used. Compounds having at least one polymerizable carbon-carbon unsaturated bond can be used as the setting binder. Specifically, compounds usable herein include aryl acrylate, benzyl acrylate, butoxy ethyl acrylate, butoxyethylene glycol acrylate, cyclohexyl acrylate, dicyclopentanyl acrylate, 2-ethylhexyl acrylate, glycerol acrylate, glycidyl acrylate, 2-hydroxyethyl acrylate, 2-hydroxypropyl acrylate, isobornyl acrylate, isodexyl acrylate, isooctyl acrylate, lauryl acrylate, 2-methoxyethyl acrylate, methoxyethylene glycol acrylate, phenoxyethyl acrylate, stearyl acrylate, ethylene glycol diacrylate, diethylene glycol diacrylate, 1,4-butadiol diacrylate, 1,5-pentadiol diacrylate, 1,6-hexanediol diacrylate, 1,3-propanediol diacrylate, 1,4-cyclohexanediol diacrylate, 2,2-dimethylolpropane diacrylate, glycerol diacrylate, tripropylene glycol diacrylate, glycerol triacrylate, trimethylol propane triacrylate, polyoxyethyl-trimethylol propane triacrylate, pentaerythritol triacrylate, pentaerythritol tetraacrylate, triethyleneglycol diacrylate, polyoxypropyl trimethylol propane triacrylate, butylene glycol diacrylate, 1,2,4-butantriol triacrylate, 2,2,4-trimethyl-1, 3-pentadiol diacrylate, diaryl fumarate, 1,10-decanediol dimethyl acrylate, dipentaerythritol hexaacrylate, and above compounds with acrylate group substituted by methacrylate group, γ-methacryloxypropyl trimethoxy silane, 1-vinyl-2-pyrrolidone, 2-hydroxyethyl acryloyl phosphate, acrylate monomer such as tetrahydrofurfuryl acrylate, dicyclopentenyl acrylate, dicyclopentenyl oxyethyl acrylate, 3-butanediol diacrylate, neopentylglycol diacrylate, polyethylene glycol diacrylate, hydroxypivalic acid ester neopentylglycol diacrylate, phenolethylene oxide modified acrylate, phenolpropylene oxide modified acrylate, N-ninyl-2-pyrrolidone, bisphenolA—ethylene oxide modified diacrylate, pentaerythritol diacrylate monostearate, tetraethylene glycol diacrylate, polypropylene glycol diacrylate, trimethylol propane propylene oxide modified triacrylate, isocyanuric acid ethylene oxide modified triacrylate, trimethylol propane ethylene oxide modified triacrylate, pentaerythritol pentaacrylate, pentaerythritol hexaacrylate, pentaerythritol tetraacrylate, and above compounds with acrylate group substituted by methacrylate group, urethane acrylate oligomer in which acrylate group is bound with oligomer having polyurethane structure, polyester acrylate oligomer in which acrylate group is bound with oligomer having polyester structure, epoxyacrylate oligomer in which acrylate group is bound with oligomer having epoxy group, urethane methacrylate oligomer in which methacrylate group is bound with oligomer having polyurethane structure, polyester methacrylate oligomer in which methacrylate group is bound with oligomer having polyester structure, epoxymethacrylate oligomer in which methacrylate group is bound with oligomer having epoxy group, polyurethane acrylate having acrylate group, polyester acrylate having acrylate group, epoxyacrylate resin having acrylate group, polyurethane methacrylate having methacrylate group, polyester methacrylate having methacrylate group, epoxymethacrylate resin having methacrylate group.

These are simply examples of usable setting binders, and usable setting binders are not limited to these examples. Content of such a setting binder is preferably in the range of 10 to 40% by weight of total solid component.

Preferably, absorptive element 121b is the primary system component that provides the detector system with performance in the visible region that closely matches the target function. Interference element 121a, in contrast, has a lesser influence on the detector system performance in the visible region because its transmission is relatively constant throughout the visible. Interference element 121a, however, desirably has a major influence in the near infrared region, providing a blocking function (low transmission, high reflectivity) to counteract the high sensitivity of the detector assembly 112 in that wavelength region. An advantage of this arrangement is that the interference element 121a can have a much simpler and more robust design than an interference element that provides both near infrared blocking and the precise variability in the visible region (bell-shaped function) required to match the human eye response. The simple, robust design produces higher yields for the interference element, and reduced waste. Another advantage of the preferred arrangement is better off-axis performance. The transmission spectrum of the absorptive element is less susceptible to wavelength shifts as a function of incidence angle than the transmission spectrum of the interference element. This is of increased importance in optical systems that illuminate the detector system 100 with a wide cone of incident light. A wavelength shift of the interference element's near-infrared reflection band into the red portion of the visible spectrum has less of an effect on performance than the same wavelength shift of the bell-shaped function used to provide the required response throughout the visible region. Thus, it is advantageous to associate the bell-shaped function in the visible region primarily with the absorbing component, and to associate the rejection of light outside the visible (near infrared and optionally ultraviolet) primarily with the interference reflector.

Figure 3:
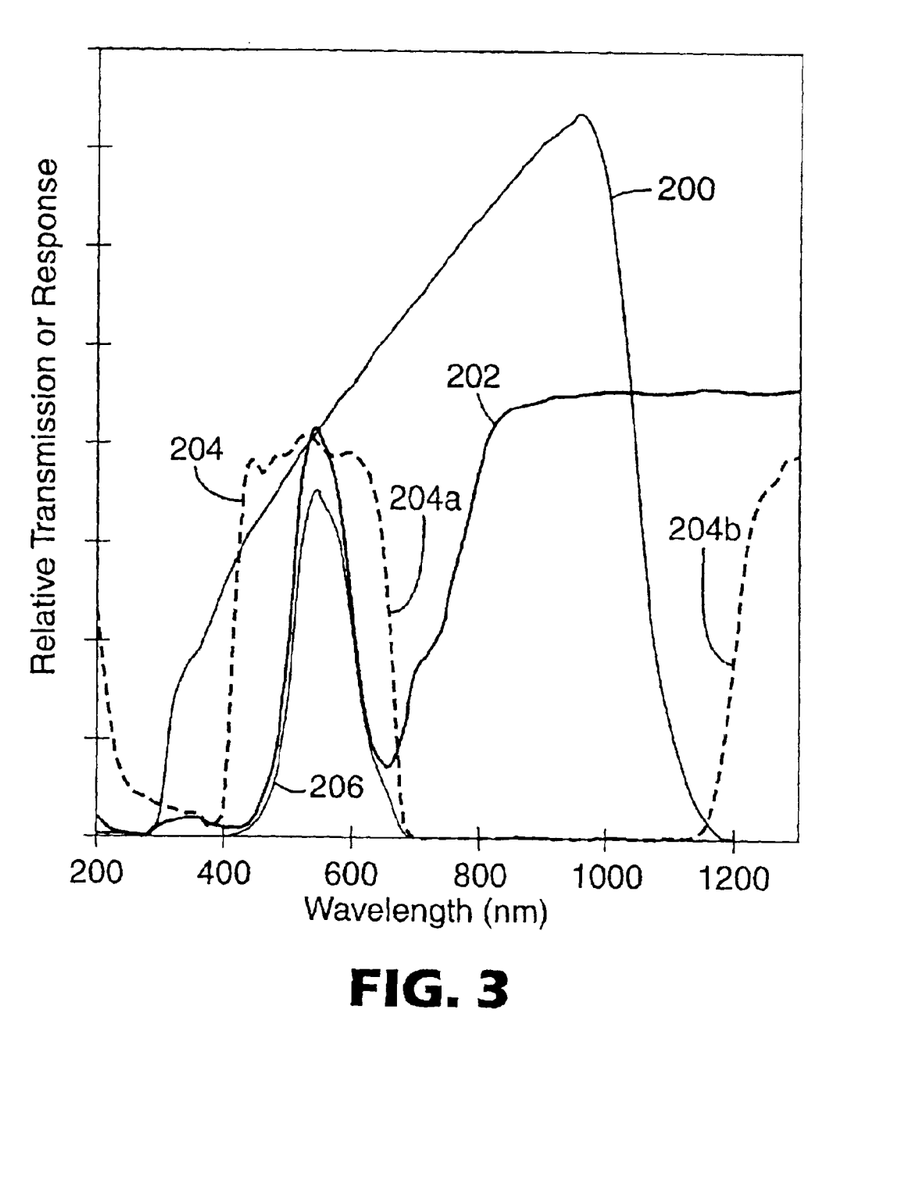
FIG. 3 is a graph of the relative spectral transmission or response of various components of the detector system.

FIG. 3 shows in idealized form the contributions of the various system components to the overall spectral response of the detector system 100. Curve 200 represents the spectral responsivity (e.g., in amps/watt) of a typical silicon photo-diode detector. Such a detector has a response in the visible region skewed toward the long wavelength (red) end of the spectrum, and continues to increase into the near infrared before it drops rapidly, becoming negligible between about 1100–1200 nm. The detector may also have a non-negligible responsivity in the ultraviolet region (below about 400 nm). Curve 202 represents the percent transmission of the absorptive element 121b. Preferably, such layer comprises both green and yellow pigment dispersed therein. Curve 202 provides an approximate bell-shaped response in the visible region, but also (undesirably) exhibits considerable light leakage at other wavelengths where the detector responsivity 200 is substantial. As shown, a large amount of light leakage in the near infrared is not uncommon, as is some leakage in the ultraviolet. Curve 204, which represents the percent transmission of the interference element at normal incidence, has a strong reflection band bounded by a short wavelength band edge 204a and a long wavelength band edge 204b. The high reflectivity of the reflection band provides a low percent transmission, preferably less than about 5%, or more preferably less than about 2% or even 1%, over most of the band. Band edge 204a, measured as the half-of-maximum transmission point or the half-of-maximum reflection point, is preferably close to the visible region for reasons explained above, preferably being located between about 630 and 770 nm, optionally from about 600 to 850 nm. Where band edge 204a is disposed substantially beyond 700 nm, an additional absorber or reflector as described in U.S. Pat. No. 6,049,419 (Wheatley et al.) can be included in the absorptive element, the interference element, or any combination thereof to block near infrared light at normal angles in the gap between about 700 nm and the band edge 204a.

Long wavelength band edge 204b is preferably disposed at least about 50 nm beyond the wavelength at which the detector responsivity becomes negligible, to allow for angular shifts for obliquely incident light and for manufacturing tolerance. In the case of silicon photodiodes, band edge 204b is preferably disposed between about 1150–1350 nm. Curve 204 also exhibits a relatively high percent transmission over most of the visible region, preferably averaging at least 50% and more preferably at least 70% or even at least 80% from 400–700 nm. Note that if the interference element comprises a ¼-wave stack or other structure that produces a significant third-order reflection, a higher order reflection band will exist in the ultraviolet region (shown in part in FIG. 3) and may extend partially into the blue end of the visible spectrum if long wavelength band edge 204b is positioned at about 1200 nm or greater. Third or higher-order reflection bands can help keep the detector system response in the ultraviolet region to acceptably low levels if the absorptive element has significant transmission in that wavelength region.

The detector system response (D($\lambda$) above) is represented by curve 206. That curve is the product of the spectral responses of all system components in the path of the incident light until it strikes the detector surface, which in this example are curves 200, 202, and 204. Curve 206 (and system response D($\lambda$)) is also preferably normalized, i.e., multiplied by a scaling constant such that the maximum value is 1. As a result, curve 206 is preferably a close match to the human eye photopic response, or a similar target response.

Some system components are more easily controlled than others to ensure the desired overall performance. For example, although techniques may well exist for modifying the spectral responsivity of semiconductor photodiodes, for purposes of the present description the detector component (curve 200) of the system response is considered an uncontrollable variable. On the other hand, interference element 121a can be designed to have a desired nominal transmission or reflectivity function, as is known, but adjusting its transmission function to compensate for, e.g., lot-to-lot variations in other system components is not preferred due to the complex nature of the manufacturing process and the difficulty and/or the high nonrecurring costs associated with changing such process. In comparison, manufacture of absorptive element 121b and adjustment thereof is relatively simple, involving (after selection of the appropriate matrix material and pigment(s)) control of the concentration of the pigment(s) and of the thickness of the element. Therefore, the absorptive element 121b is preferably manufactured after the spectral characteristics of detector assembly 112, interference element 121a, and any other system components are measured and/or otherwise known. Through calculation and/or trial-and-error, the pigment concentration(s) and thickness of element 121b are controlled to minimize an average deviation from the target response. The spectral transmittance of the optical filter is designed, for example, as follows.

First, the spectral sensitivity of the detector is measured at least in the visible and near infrared regions, and furthermore the spectral sensitivity (spectral transmission) of interference element 121a is measured at least over the same wavelength regions. Also, the extinction coefficients of the pigment(s) to be used in absorptive element 121b are measured in a predetermined wavelength region. The extinction coefficients are substituted into a general formula of the Lambert-Beer law, to obtain an equation that is required for the calculation of the spectral transmittance of absorptive element 121b (but which uses as independent variables pigment concentration and thickness of the film or other body). If two or more pigments are to be used, it is assumed that they act independently, and are contained uniformly in element 121b.

Using the detector sensitivity, the interference element sensitivity, the Lambert-Beer equation, and a scaling factor, a normalized system response function $D(\lambda)$ is calculated and the figure of merit FM from Eq. (1) above is obtained in a mathematical form as a function of the independent variables (pigment concentration and thickness of the absorptive element). Then, using, for example, a simplex method (a finite recurrence algorithm used in linear programming, to obtain optimal solution by successive approximation), a computer simulation is carried out to determine the optimal values for those variables, and the element such as a film is manufactured accordingly. Instead of this computational method, a trial-and-error method that utilizes experiments or the like can also be used to determine the optimal values for the thickness of the visible light correcting member and the concentrations of the green pigment and the yellow pigment and the ratio.

As described above, the concentrations of the green and yellow pigment in the absorptive element 121b depend upon the thickness of the element. Thus, the concentrations are not uniquely defined, but are generally in the range of 10 to 50%, preferably 20 to 40%, by weight of the layer in which they are dispersed.

Additional layers and elements can also be used in the detector system, such as an EMI shielding layer, antistatic layer, UV-cutting layer, stain-proofing layer, and the like, such as are described in PCT publication WO 99/39224 (Ouderkirk et al.). A diffuser can also be used to increase the detector system's angle of acceptance, and to make the detector system less sensitive to spatial and/or angular variability in the incident light. Preferably, the diffuser has a high percent transmission (at least about 90%, more preferably at least about 95%) over the entire visible spectrum but also has a high haze value (at least about 80%, more preferably at least about 85%) so that even though nearly all incident light passes through the diffuser, that light is spread out into a wide cone angle. One suitable diffuser is available from Kimoto Ltd. under model 100LSE, which has a 95.4% visible transmission and 83.9% haze. The model 100LSE diffuser comprises a PMMA particle layer (mean particle size of 30 μm) on a 100 μm thick PMMA film. Another suitable diffuser is available from Reyco Ltd. under model TRX-110, having a 97.7% visible transmission and 89.8% haze. For some applications, it may be desirable to mix a diffusing element into the absorptive element matrix so that both can be coated out in a single operation.

A wide variety of configurations for filter assembly 110, detector assembly 112, and components thereof are possible. Elements 121a, 121b can be manufactured separately and then adhered together with a transparent adhesive layer. They can also simply be stacked one on top of the other, with or without an intervening space, window, or other optical element such as those mentioned above. In some constructions, the absorptive element 121b can be applied as a pigmented resin to an already-made interference film, followed by a curing step. In such cases, the pigmented resin can be applied using batch processes such as spin-coating, or using continuous processes such as knife coating, die coating, or the like.

Elements 121a, 121b can alternatively be manufactured as a unitary body or film such as by incorporating the pigment or other colorant into one or more layers of an interference film, including into any skin layers (optically thick layers) the interference film may comprise. When the interference element 121a is a laminate of two or more multilayer optical films joined by an optically clear adhesive layer, some or all of the absorptive colorant can also be incorporated into the adhesive layer of the laminate.

Figure 2A:
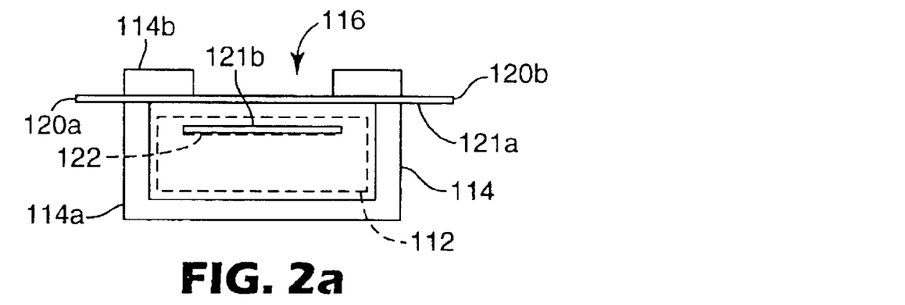
FIGS. 2a and 2b are cross-sectional views similar to FIG. 2 but of alternative filter assemblies.

In still another approach, the absorptive element can be applied as a pigmented resin to another surface, including directly to the active surface 122 of the detector, and then cured. See FIG. 2a. In such case the pigmented resin can be spun-coated onto the semiconductor wafer from which a large number of individual detectors can be obtained by dicing. Prior to dicing, the resin is cured by application of heat or radiation as appropriate. Patterning the cured resin with standard photolithographic techniques can also be done, for example to expose areas of the substrate for electrical contact. The absorptive element can also comprise distinct layers or films each of which contributes partially to the required absorption function. For example, absorptive element 121b can include a green pigmented film and a separate yellow pigmented film. Other methods of applying the pigmented resin to the detector or other substrates can be used, such as ink-jet printing, silk-screening, or the like.

If elements 121a, 121b are maintained as distinct components, the absorptive element can be placed in the optical path in front of the interference element (i.e., light propagating towards the detector active area passes through the absorptive element before passing through the interference element) or vice versa. If the absorptive element is in front of the interference element, less light is reflected by the detector system, thus reducing stray light. If the interference element is in front of the absorptive element, less total light is absorbed by the optical filter, which can be beneficial for long life.

Figure 2B:
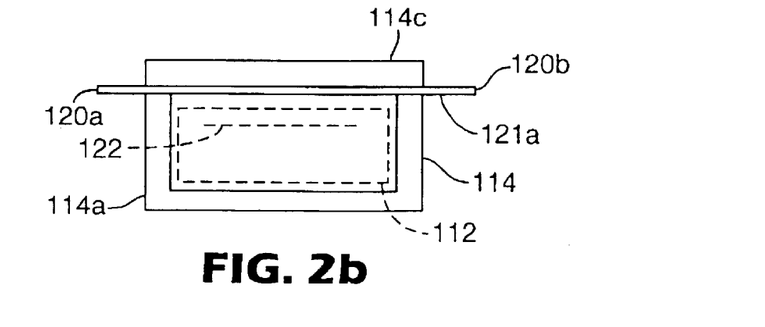

The absorptive element can be incorporated in whole or in part in the filter housing 114. As shown in FIG. 2b, the filter housing need not have a filter aperture but instead can comprise a partially transparent upper portion 114c that comprises one or more colorants dispersed therein. In such case the filter housing can have only one aperture 118, for insertion of the detector assembly. Further, one or more colorants can be dispersed in the potting material referred to previously. Such potting material can then serve the dual purpose of holding the detector assembly 112 in place within the filter housing and at least partially filtering visible light.

For automated manufacturing, long discrete strips of the interference element 121a can be cut out of a larger piece such as a sheet or roll of such film. If the interference film comprises a stack of polymeric microlayers as described above, non-contact laser cutting techniques are preferred over mechanical cutting techniques because the former have been found to produce boundaries or edges for the strips that are less susceptible to delamination. Preferably, a removable liner covers the interference element 121a during the laser cutting operation, and discrete strips of the liner formed as a result of the cutting are then removed from corresponding strips of element 121a with an adhesive tape. A plurality of filter housing halves 114a, 114b such as shown in FIGS. 1 and 2 can be bonded together simultaneously to form a linear array of substantially identical filter housings 114 uniformly spaced along the strip of element 121a. If individual filter housings are desired, the strip of element 121a, preferably a film or film body, can be severed between the housings. See U.S. patent application Ser. No. 10/268,118, filed Oct. 10, 2002, entitled "Method for Subdividing Multilayer Optical Film Cleanly and Rapidly," incorporated herein by reference. The laser cutting system can also be used to provide the interference element with a melt zone to control delamination, as described in U.S. patent application Ser. No. 10/268,354 filed Oct. 10, 2002, entitled "Multilayer optical Film With Melt Zone to Control Delamination," incorporated herein by reference.

EXAMPLES

In the examples that follow, the various system components were made or obtained as follows:

Green Ink (G1)

Figure 4:
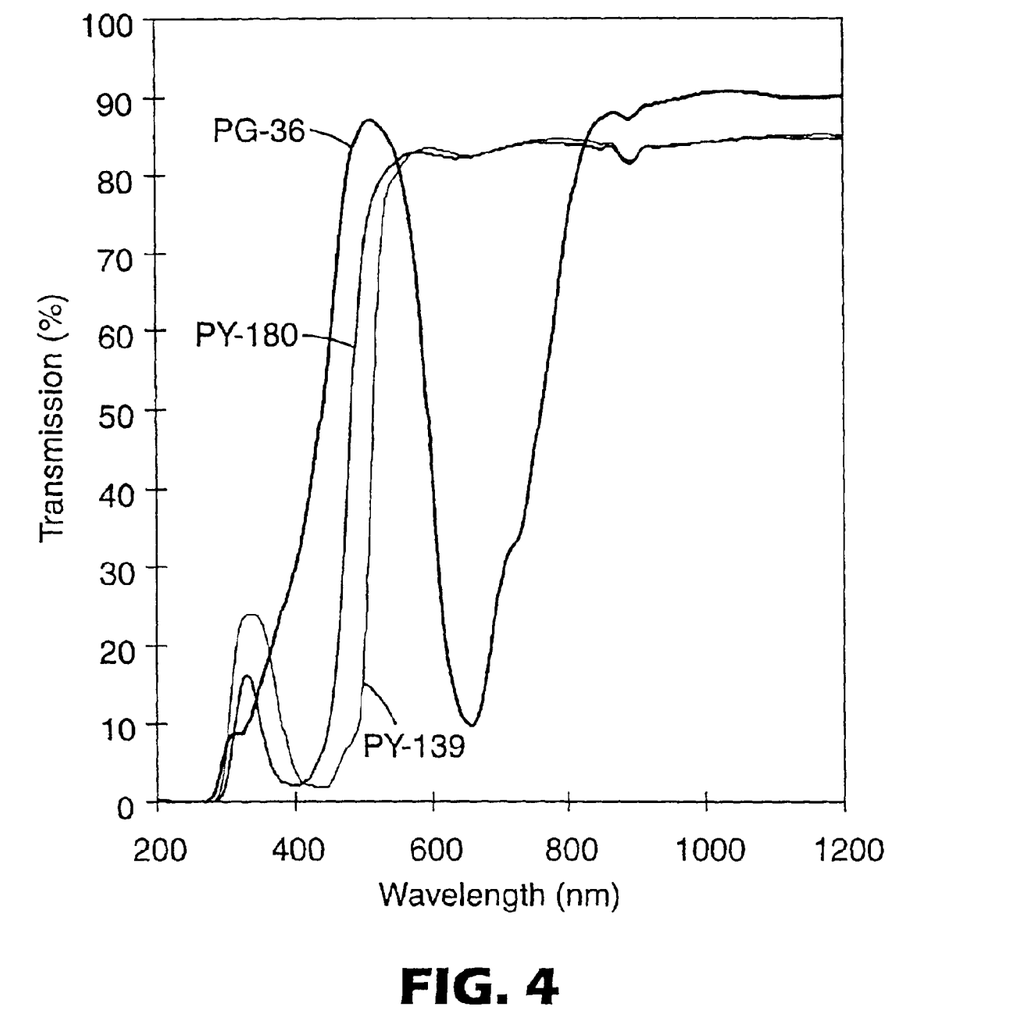
FIGS. 4 and 5 are graphs of percent transmission versus wavelength.

100 parts by weight of green pigment type PG-36 (sold under trade name Hostaperm Green 8G by Clariant GmbH) and 35 parts by weight of a pigment dispersing agent (sold under trade name Disperbyk 2000 by BYK Chemie) were dispersed using a sand mill in a 85:15 solvent mixture of propyleneglycol monomethylether acetate and butyl Cellosolve. Content of solid component was 27%. For analysis purposes, the ink was applied to a glass substrate and cured using a convection oven at about 80° C. to a thickness of about 0.5 µm. The percent transmission of the green pigment thus prepared was measured from 200 to 1300 nm on a Hitachi model U-4000 spectrometer, and is shown in FIG. 4 as curve PG-36.

First Yellow Ink (Y1)

100 parts by weight of yellow pigment type PY-139 (manufactured by BASF, Paliotol Yellow D1819) and 15 parts by weight of a pigment dispersing agent (sold under trade name Disperbyk 2000 by BYK Chemie) were dispersed using a sand mill in a 85:15 solvent mixture of propyleneglycol monomethylether acetate and butyl Cellosolve. Content of solid component was 25%. For analysis purposes, the ink was applied to a glass substrate and cured using a convection oven at about 80° C. to a thickness of about 0.5 µm. The percent transmission of the yellow pigment thus prepared was measured from 200 to 1300 nm on a Hitachi model U-4000 spectrometer, and is shown in FIG. 4 as curve PY-139.

Second Yellow Ink (Y2)

100 parts by weight of yellow pigment type PY-180 (sold as HGTRAN yellow toner by Clariant GmbH) and 50 parts by weight of a pigment dispersing agent (sold under trade name Disperbyk 2000 by BYK Chemie) were dispersed using a sand mill in a 85:15 solvent mixture of propyleneglycol monomethylether acetate and butyl Cellosolve. Content of solid component was 25%. For analysis purposes, the ink was applied to a glass substrate and cured using a convection oven at about 80° C. to a thickness of about 0.5 µm. The percent transmission of the yellow pigment thus prepared was measured from 200 to 1300 nm on a Hitachi model U-4000 spectrometer, and is shown in FIG. 4 as curve PY-180.

First Mixed Ink Composition (GY1)

Figure 5:
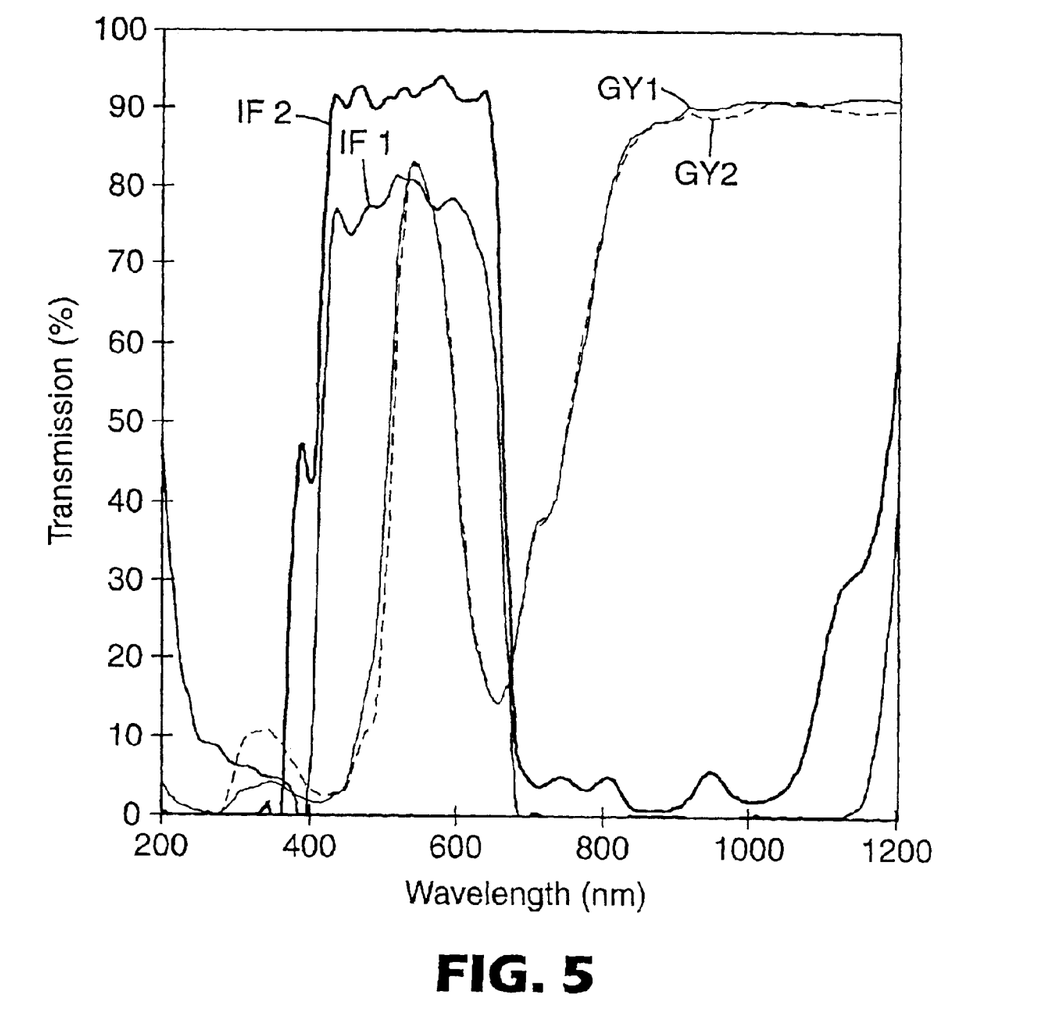

G1, Y1, and Y2 prepared as described above were mixed in the final pigment ratio of PG-36: PY-139: PY-180= 54:35:11. Styrene acrylic acid resin (sold under trade name Johncryl 690 by Johnson Polymer) and epoxy resin (type Denachor EX614, manufactured by Nagase Chem Tex) in the ratio of 3:1 were added as the binder resin, and the final proportion of the pigments was adjusted to 25% by weight. The solvent composition of the final ink composition was propyleneglycol monomethylether acetate: toluene: butyl Cellosolve=75:15:10, and the content of solid component was 17%. For analysis purposes, the ink composition was applied to a glass substrate and cured using a convection oven at about 80° C. to a thickness of about 1.7 µm. The percent transmission of the first mixed pigment thus prepared was measured from 200 to 1300 nm on a Hitachi model U-4000 spectrometer, and is shown in FIG. 5 as curve GY1.

Second Mixed Ink Composition (GY2)

G1 and Y1 prepared as described above were mixed in the final pigment ratio of PG-36: PY-139=50:50. Styrene acrylic acid resin (sold under trade name Johncryl 690 by Johnson Polymer) and epoxy resin (type Denachor EX614, manufactured by Nagase Chem Tex) in the ratio of 3:1 were added as the binder resin, and final proportion of the pigments was adjusted to 25% by weight. The solvent composition of the final ink composition was propyleneglycol monomethylether acetate:toluene:butyl Cellosolve=75:15:10, and content of solid component was 17%. For analysis purposes, the ink composition was applied to a glass substrate and cured using a convection oven at about 80° C. to a thickness of about 1.7 µm. The percent transmission of the second mixed pigment thus prepared was measured from 200 to 1300 nm on a Hitachi model U-4000 spectrometer, and is shown in FIG. 5 as curve GY2.

First Interference Element (IF1)

A polymeric multilayer interference film was manufactured by coextruding alternating layers of a low melt coPEN made from a 90/10 copolymer of polyethylene naphthalate (PEN)/polyethylene terephthalate (PET) and polymethylmethacrylate (PMMA) at about 277° C. to form an extrudate having 224 individual layers sandwiched between two outer skin layers composed of the low melt coPEN. These layers defined an optical packet consisting essentially of 112 unit cells with an approximately linear thickness gradient along an axis perpendicular to the stack. The thickest unit cell, located at one side of the packet, was approximately 1.3 times thicker than the thinnest unit cell, located at the other side of the packet. The optical packet was asymmetrically multiplied to give a multilayer optical film construction having 448 individual layers with outer skin layers and an interior polymer boundary layer (PBL) between packets. The layer multiplication was carried out so that one of the optical packets had an overall thickness about 1.3 times that of the other packet. The extrudate was quenched on a chill roller to form a cast multilayer film. The cast film was sequentially stretched in the machine direction (MD) and the transverse direction (TD) using stretch ratios 3.4:1 and 3.4:1 respectively, producing a finished film having in-plane refractive indices ($n_{1x}$, $n_{1y}$) and an out-of-plane refractive index ($n_{1z}$) of about 1.744, 1.720, and 1.508 respectively in the coPEN layers, and in-plane refractive indices ($n_{2x}$, $n_{2y}$) and an out-of-plane refractive index ($n_{2z}$) of about 1.495, 1.495, and 1.495 respectively in the PMMA layers. All indices were measured with a Metricon surface wave characterization device at 550 nm. The finished film comprised two optical packets each of ¼-wave design, and each with an approximately linear thickness gradient along an axis perpendicular to the plane of the film to give a range of reflected wavelengths within each optical packet. The thickest unit cell in the finished film had a thickness about 1.8 times that of the thinnest unit cell in the finished film, corresponding to a range of reflected wavelengths from approximately 665 nm to 1220 nm. Skin layers on the outsides of the optical structure were low melt coPEN, with an approximate thickness of 11 μm (0.43 mils). The overall film thickness was about 90 μm (3.7 mils).

Two substantially identical rolls of multilayer film made as described above were selected on basis of their optical properties, and were corona treated to improve adhesion. One of the corona-treated films was coated with a UV-initiated adhesive at approximately 122 μm (5 mils) and irradiated with UV light to activate the curing process of the adhesive. The adhesive, made by a hot melt extrusion process, was a homogeneous mixture of a thermoplastics component (ethylene vinyl acetate), a curable resins component (mixture of epoxy and polyol), and a photoinitiator component (a triaryl sulfonium hexafluoroantimonate salt). The two multilayer films were then laminated together and curing of the laminate adhesive was accelerated with a heat soak at 25° C. (80° F.) for 10 minutes. The resulting film body or interference element ("IF1") consisted of two multilayer optical films with a clear adhesive layer in between. The element was in the form of a roll and had a thickness of approximately 300 μm (12.4 mils).

The interference element IF1 thus constructed exhibited a reflection band in the near infrared wavelength region and a pass band in the visible region for normally incident light. Percent transmission was about 70% or more from about 450–640 nm, and was less than 1% from about 700–1140 nm, and less than 5% from 680–700 nm and from 1140–1160 nm. The percent transmission was measured using unpolarized normally incident light from 200 to 1300 nm on a Hitachi model U-4000 spectrometer, and is shown in FIG. 5 as curve IF1 and in FIG. 3 as curve 204.

Second Interference Element (IF2)

An inorganic dielectric multilayer film deposited on an absorbing glass filter substrate (collectively referred to as interference element "IF2") was taken from a Yahoo digital video camera, model 03–146. The IF2 was originally coupled to a detector but was separated therefrom for purposes of these examples. The IF2 film-glass substrate combination or film body had a physical thickness of about 1 mm and a square aperture size of about 10 mm by 10 mm. The transmission spectrum at normal incidence was measured from 200 to 1300 nm on a Hitachi model U-4000 spectrometer, and the result is shown in FIG. 5 as curve IF2.

Detector

A silicon PIN photodiode detector, model S7329, was obtained from Hamamatsu Photonics Co. The detector includes a clear plastic package and a 2 mm by 2 mm active area. The spectral responsivity of the detector was measured from 200 to 1300 nm using a Hitachi model U-4000 spectrometer, and the result is shown in FIG. 3 as curve 200.

General Procedure

In each of examples 1–6, one of the ink compositions was coated onto a first major surface of a base layer and cured to form an absorptive film. In some cases the base layer was the interference element IF1; in other cases it was a plain polyethylene terephthalate (PET) film (type OX Film, manufactured by Teijin Co.) having a thickness of about 50 μm. If the base layer was the PET film, an acrylic adhesive was coated to the second major surface (opposite the first major surface) of the base layer and the adhesive-coated surface was adhered to a piece of the interference element (Examples 1, 4) or to the active surface of the detector (Example 5). In each case, the CIE tristimulus values (X,Y,Z) of the absorptive element (i.e., the cured ink layer) by itself were measured using an Ohtsuka Denshi model MCPD 2000 spectrometer with a C light source. From the tristimulus values the CIE 1931 standard chromaticity values (x, y, z) were calculated as follows, and recorded:

$$x = \frac{X}{X+Y+Z}$$
$$y = \frac{Y}{X+Y+Z}$$
$$z = \frac{Z}{X+Y+Z}$$

Also in each case, the interference element and absorptive element were both positioned over the silicon photodiode to produce a detector system. The spectral sensitivity of the detector system was measured in the wavelength region of 380 to 1200 nm using a Hitachi monochromator. For each wavelength, the electrical current generated by the photodiode was converted to a voltage using a current-to-voltage amplifier, and was measured as a voltage. After these values were measured at each wavelength, a relative spectral sensitivity for the detector system was obtained by dividing the measured values by the maximum voltage value obtained, such that the maximum value of the relative spectral sensitivity was 1.0. Deviation of the relative spectral sensitivity from the standard photopic human eye response (also a normalized function, having a maximum value of 1.0) was then calculated using Eq. 1 above. Since Eq. 1 does not take into account performance beyond 780 nm, the relative spectral sensitivity at 800, 900, 1000, and 1100 nm was noted separately. The detector system was then placed in an environment of 85° C. and 85% relative humidity for 250 hours, after which the optical filter was visually inspected for the presence or absence of bleed and loss of transparency. Results are shown in Table 1. Note that each of the six examples exhibited a relative spectral sensitivity for the detector system of no greater than about 1% at the near infrared wavelengths, and each achieved a figure of merit FM relative to the photopic function V(λ) of less than 20%, and in some cases less than 15%.

Comparative examples were then constructed as described below, and then were tested for (1) deviation from photopic human eye response, (2) relative spectral sensitivity at 800, 900, 1000, and 1100 nm, and (3) presence or absence of bleed and loss of transparency after placement in an environment of 85° C. and 85% relative humidity for 250 hours, in the same manner as the examples. The results are also shown in Table 1.

Example 1

Mixed ink composition GY1 was coated onto PET base film (Teijin Co.) using a mayerbar, and organic solvent was evaporated in an oven at 80° C. After drying, a PET film having a 1.7 μm thick green/yellow pigment layer was obtained. This film was further maintained in the oven at 70° C. for 24 hours to promote crosslinking reaction. The green/yellow absorptive film had chromaticity values x=0.368, y=0.532. After adhering the absorptive film to the interference film IF1 with acrylic adhesive, the combined film was placed over the detector such that incident light impinged first on the absorptive element and then on the interference element.

Example 2

The interference element IF1 was laser cut to form strips using the procedure described in U.S. patent application Ser. No. 10/268.118. filed Oct. 10. 2002, entitled "Method for Subdividing Multilayer Optical Film Cleanly and Rapidly" described above. Before removing the strips from the bottom liner, mixed ink composition GY2 was coated onto interference element IF1 using a spin coater, and organic solvent was evaporated in an oven at 80° C. After drying, a polymer multilayer interference element having a 1.7 μm thick green/yellow absorptive film thereon was obtained. This combination was further maintained in the oven at 70° C for 24 hours to promote crosslinking reaction. The green/yellow absorptive film had chromaticity values x=0.391, y=0.551. A strip of this combination was removed from the bottom liner, placed in an injection molding machine, and a box-type filter housing (see FIG. 1) was formed around the strip. The resulting filter assembly was placed over the detector such that incident light impinged first on the absorptive element and then on the interference element.

Example 3

The interference element IF1 was laser cut to form strips using the procedure described in the U.S. patent application Ser. No. 10/268.118. filed Oct. 10. 2002, entitled "Method for Subdividing Multilayer Optical Film Cleanly and Rapidly" described above. Before removing the strips from the bottom liner, mixed ink composition GY2 was coated onto interference element IF1 using a spin coater, and organic solvent was evaporated in an oven at 80° C. After drying, a polymer multilayer interference element having a 1.7 μm thick green/yellow absorptive film thereon was obtained. This combination was further maintained in the oven at 70° C for 24 hours to promote crosslinking reaction. The green/yellow absorptive film had chromaticity values x=0.391, y=0.551. A strip of this combination was removed from the bottom liner, placed in an injection molding machine, and a box-type filter housing (see FIG. 1) was formed around the strip. The resulting filter assembly was placed over the detector such that incident light impinged first on the interference element and then on the absorptive element.

Example 4

Mixed ink composition GY1 was coated onto PET base film (Teijin Co.) using a mayerbar, and organic solvent was evaporated in an oven at 80° C. After drying, a PET film having a 1.7 μm thick green/yellow layer was obtained. This film was further maintained in the oven at 70° C. for 24 hours to promote crosslinking reaction. The green/yellow absorptive film had chromaticity values x=0.368, y=0.532. After adhering the absorptive film to the interference element IF2 with acrylic adhesive, the combination was placed over the detector such that incident light impinged first on the absorptive element and then on the interference element.

Example 5

Mixed ink composition GY1 was coated onto PET base film (Teijin Co.) using a mayerbar, and organic solvent was evaporated in an oven at 80° C. After drying, a PET film having a 1.7 μm thick green/yellow layer was obtained. This film was further maintained in the oven at 70° C. for 24 hours to promote crosslinking reaction. The green/yellow absorptive film had chromaticity values x=0.368, y=0.532. An acrylic adhesive was coated onto the second major surface of the PET film opposite the pigmented layer, and the film was adhered via the acrylic adhesive directly to the active surface of the detector. Then, the interference element IF1 was placed over the pigmented layer to produce a detector system.

Example 6

Mixed ink composition GY2 was coated onto interference element IF1 using a spin coater, and organic solvent was evaporated in an oven at 80° C. After drying, a polymer multilayer interference element having a 1.7 μm thick green/yellow absorptive film thereon was obtained. This combination was further maintained in the oven at 70° C. for 24 hours to promote crosslinking reaction. The green/yellow absorptive film had chromaticity values x=0.391, y=0.551. A piece of the combination was cut with a simple scissors. An acrylic adhesive was applied to a surface of the combination opposite the pigmented film, and the resulting construction was adhered via the acrylic adhesive directly to the active area of the detector.

Comparative Example 1

A plastic optical filter manufactured by Kureha Chemical Industry Co., was obtained from a USB CCD camera made by I-O Data Device, Inc. This filter was connected to the detector, and the resulting detector system was measured and evaluated in the same way as the preceding examples.

Comparative Example 2

A commercial absorption glass filter, type CM500, manufactured by Hoya Co., Ltd., was obtained. This filter was connected to the detector, and the resulting detector system was measured and evaluated in the same way as the preceding examples.

Comparative Example 3

The interference element IF2 was connected to the detector, and the resulting detector system was measured and evaluated in the same way as the preceding examples.

Comparative Example 4

A silicon photodiode-based detector system having a human eye response corrective filter was obtained. The detector system was sold commercially as model S7160-01 by Hamamatsu Photonics Co. The corrective filter had an inorganic vapor-coated dielectric multilayer film combined with an absorption glass. The corrective filter was separated from the remainder of the commercial detector system, and was connected to the detector used in the preceding examples.

TABLE 1

| Example | Figure of merit (FM) relative to photopic response (see Eq. 1) | Relative spectral sensitivity in near infrared | | | | Bleed and loss of transparency observed after 250 hours at 85° C., 85% RH |
|---|---|---|---|---|---|---|
| | | 800 nm | 900 nm | 1000 nm | 1100 nm | |
| 1 | 12.1% | 0.00 | 0.00 | 0.00 | 0.00 | No |
| 2 | 17.7% | 0.00 | 0.01 | 0.01 | 0.00 | No |
| 3 | 17.7% | 0.00 | 0.01 | 0.01 | 0.00 | No |
| 4 | 13.8% | 0.00 | 0.00 | 0.01 | 0.01 | No |
| 5 | 14.5% | 0.00 | 0.00 | 0.00 | 0.00 | No |
| 6 | 16.5% | 0.00 | 0.01 | 0.01 | 0.00 | No |
| CE-1 | 48.8% | 0.02 | 0.06 | 0.23 | 0.08 | Yes |
| CE-2 | 48.2% | 0.00 | 0.00 | 0.00 | 0.00 | Yes |
| CE-3 | 58.0% | 0.00 | 0.00 | 0.00 | 0.01 | No |
| CE-4 | 13.9% | 0.00 | 0.00 | 0.00 | 0.00 | Yes |

Various modifications and alterations of this invention will be apparent to those skilled in the art without departing from the scope and spirit of this invention, and it should be understood that this invention is not limited to the illustrative embodiments set forth herein.

What is claimed is:

1. A filter suitable for use with a detector, the filter comprising:
    an interference element that substantially reflects normally incident light over a band of near-infrared wavelengths and that substantially transmits normally incident light over visible wavelengths; and
    an absorptive element that absorbs light non-uniformly over visible wavelengths, the absorptive element comprising a colorant dispersed in a polymeric matrix;
    wherein the filter when combined with the detector yields a detector system whose relative response approximates a visual response of the human eye.

2. The filter of claim 1, wherein the interference element transmits at least about 70% of normally incident light on average between about 400–700 nm.

3. The filter of claim 2, wherein the interference element transmits less than about 5% of normally incident light between about 700–1100 nm.

4. The filter of claim 3, wherein the interference element transmits less than about 2% of normally incident light between about 700–1100 nm.

5. The filter of claim 1, wherein the band of near-infrared wavelengths has a short-wavelength band edge disposed at a wavelength between about 600–850 nm.

6. The filter of claim 1, wherein at least one of the interference element and the absorptive element is disposed on a frame adapted to receive the detector.

7. The filter of claim 1, wherein the colorant comprises at least one pigment.

8. The filter of claim 7, wherein the at least one pigment comprises a green pigment.

9. The filter of claim 8, wherein the at least one pigment further comprises at least one yellow pigment.

10. The filter of claim 1, further comprising a diffuser.

11. The filter of claim 1, wherein the detector comprises a silicon photodiode.

12. The filter of claim 1, wherein the relative response deviates from the photopic response of the human eye by an average of less than about 20%.

13. The filter of claim 1, wherein the interference element comprises a laminate structure, and the absorptive element is at least partially disposed in at least one layer of the laminate structure.

14. The filter of claim 13, wherein the laminate structure comprises an adhesive layer and wherein the absorptive element is disposed in the adhesive layer.

15. A detector system, comprising the filter of claim 1 in combination with the detector.

16. The detector system of claim 15, wherein at least a portion of the absorptive element is disposed on the detector.

17. The detector system of claim 15, wherein the interference element is spaced apart from the detector.

18. The detector system of claim 15, further comprising a filter housing, and wherein the interference element is connected to the filter housing.

19. The detector system of claim 18, further comprising a potting material between the detector and the interference element, and wherein the potting material comprises at least a portion of the absorptive element.

20. The detector system of claim 15, further comprising a filter housing, and wherein at least a portion of the filter housing comprises at least a portion of the absorptive element.

21. A method of making a filter suitable for use with a detector, the method comprising:
    providing an interference element that reflects normally incident light over a band of near-infrared wavelengths and substantially transmits normally incident light over visible wavelengths;
    loading an absorptive colorant that absorbs light non-uniformly over visible wavelengths into a resin;
    shaping the resin to form an absorptive element; and
    combining the interference element and the absorptive element to provide the filter;
    wherein the filter when combined with the detector yields a detector system whose relative response for normally incident light approximates a visual response of the human eye.

22. The method of claim 21, wherein the relative response deviates from the photopic response of the human eye by an average of less than about 20%.

23. The method of claim 21, wherein the method comprises forming a film of the resin on a substrate.

24. The method of claim 23, wherein the substrate comprises the interference element.

25. The method of claim 23, wherein the substrate comprises the detector.

26. The method of claim 21, wherein the method comprises connecting the interference element to a filter frame.

27. The method of claim 26, wherein the filter frame is at least partially transparent and comprises the colorant-loaded resin.

28. The method of claim 26, wherein the filter frame has a cavity to receive the detector, and wherein the method comprises placing a potting material that comprises the colorant-loaded resin into the cavity and inserting the detector into the cavity.

29. The method of claim 21, wherein the providing step comprises forming a laminate structure, and at least one layer of the laminate structure comprises the colorant-loaded resin.

* * * * *